UNITED STATES PATENT OFFICE.

RICHARD W. HEARD AND RICHARD A. L. SNYDER, OF PITTSBURG, PENNSYLVANIA, ASSIGNORS TO THE MICA MACHINE COMPANY, OF PITTSBURG, PENNSYLVANIA, A CORPORATION.

METHOD OF SEPARATING LAMINÆ OF MICA.

SPECIFICATION forming part of Letters Patent No. 686,929, dated November 19, 1901.

Application filed April 24, 1901. Serial No. 57,261. (No specimens.)

*To all whom it may concern:*

Be it known that we, RICHARD W. HEARD and RICHARD A. L. SNYDER, citizens of the United States, residing at Pittsburg, in the county of Allegheny and State of Pennsylvania, have invented or discovered certain new and useful Improvements in Methods of Separating Laminæ of Mica, of which improvements the following is a specification.

The invention described herein relates to certain improvements in splitting or separating mica into thin laminæ. The effective separation of the laminæ of mica, whether by hand or by machinery, has always heretofore involved the employment of thin blades. While this means does not involve much loss when the mica has a good cleavage, the separation into very thin laminæ is slow, and therefore expensive. When the mica has a poor cleavage, the waste when a blade is employed is very large.

The invention described herein consists, generally stated, in effecting an "opening up" of the laminæ, and by this term is meant such a lessening of the cohesion of the laminæ or releasing or reducing the bond which naturally unites adjacent laminæ of mica as will permit the entrance of a fluid between adjacent laminæ and then charging the spaces thus formed with a fluid.

The invention further consists in treating the mica as above and then subjecting the same to pressure, whereby the fluid is caused to spread out and act as a wedge to effect a more complete separation of the laminæ.

The invention is hereinafter more fully described and claimed.

In the accompanying drawings, forming a part of this specification, Figure 1 is a diagrammatic view of a form of apparatus for the practice of our invention, and Fig. 2 is a similar view of a modification of the apparatus.

In the practice of the invention the sheets or blocks of mica are subjected to a treatment which will open up the laminæ sufficiently to permit of the entrance of a fluid between the laminæ. While this treatment will if repeated often effect a good separation of laminæ, a more perfect separation can be effected by opening up the laminæ to permit of the entrance of the fluid, and when so charged with fluid the sheets or blocks are subjected to pressure, which is preferably applied progressively from point to point. This pressure will cause a spreading or diffusion of the fluid and by its mechanical or wedging action will effect a separation of the laminæ from each other without injury thereto.

A desirable means for carrying out the invention consists in heating a sheet or block in a furnace 1 or in any other suitable manner and then immersing the same in a liquid, as water, in a basin or tank 2. The heating produces such a change in the natural relation of the laminæ that when immersed in the liquid the latter will permeate the sheet or block entering between laminæ to a greater or less extent. By repeating the heating and immersion a number of times the laminæ will be entirely separated from each other; but a more rapid and effective separation can be produced if the sheet or block when charged with liquid is subjected to pressure, preferably by passing it between rollers 3. When pressure is applied, the liquid will be caused to spread, and, acting like a wedge, will effect a splitting or separation of laminæ. In addition to its separating action the liquid seems to act as a lubricant, so that by subjecting the sheet or block to a rubbing action, as by rotating the pressure-rollers in opposite directions or at different speeds in the same direction, the laminæ will slip along each other. By repeating these operations—*i. e.*, heating, subjecting to pressure, and rubbing—an exceedingly fine subdivision of the mica can be obtained.

The preliminary opening up of the laminæ can be effected by placing the sheets or blocks in a chamber, exhausting the air, &c., from the chamber, then immersing the exhausted sheet or block in a liquid, and passing the liquid-charged blocks through between rollers. A convenient apparatus for the carrying out of this method consists in shell 4, arranged over a receptacle 5, containing the liquid. The mica is placed on a tray 6, which is movably supported by a rod 7. The shell is connected to a suitable vacuum-pump and is provided with a valved inlet 8 for air. While the air is being exhausted the tray is held above the liquid, and as soon as the desired vacuum is obtained the tray is pulled down into the liquid, the inlet-valve is opened, the shell removed, and a new charge placed on the tray. If necessary, the mica can be treated several times before removing it from the tray.

While not stated as a fact, there seems to be a fluid between the laminæ of mica in a natural state and that this fluid is expanded or driven out when mica is heated or placed in a vacuum and that the fluid is replaced by the liquid when immersed therein. It may be that the heat acts in a different manner from the vacuum. Howsover that may be there is such an opening up of the laminæ in both cases as to permit of the entrance of water, which will serve to more effectively open up the mica when it is subjected to pressure.

We claim herein as our invention—

1. As an improvement in the art of separating laminæ of mica, the method herein described, which consists in opening up the laminæ of a piece of mica and then charging the opened-up piece with liquid, substantially as set forth.

2. As an improvement in the art of separating laminæ of mica the method herein described, which consists in heating up a piece of mica and then charging the same with a liquid, substantially as set forth.

3. As an improvement in the art of separating the laminæ of mica, the method herein described, which consists in opening up the laminæ, charging the opened-up piece with liquid and then subjecting the piece to pressure, substantially as set forth.

4. As an improvement in the art of separating the laminæ of mica, the method herein described, which consists in heating up a piece of mica, immersing the piece in liquid and then subjecting the piece to pressure, substantially as set forth.

5. The method herein described which consists in preliminarily releasing or lessening the bond or force which naturally unites the adjacent sheets or laminæ of mica, and then subjecting the same to the action of suitable fluid, substantially as set forth.

6. As an improvement in the art of separating the laminæ of mica, the method herein described, which consists in opening up the laminæ of a piece of mica, charging the opened-up piece with liquid and the subjecting of the piece to a rubbing pressure, substantially as set forth.

In testimony whereof we have hereunto set our hands.

RICHARD W. HEARD.
RICHARD A. L. SNYDER.

Witnesses:
DARWIN S. WOLCOTT,
F. E. GAITHER.